(12) United States Patent
Yu

(10) Patent No.: US 6,575,529 B1
(45) Date of Patent: Jun. 10, 2003

(54) SEAT ASSEMBLY OF BICYCLE

(76) Inventor: Tsai-Yun Yu, No. 1-2, Lane 1147, Sec. 1, Chung San Road, Ta Chia Chen, Taichung Hsien (TW)

(*) Notice: Subject to any disclaimer, the term of this patent is extended or adjusted under 35 U.S.C. 154(b) by 0 days.

(21) Appl. No.: 10/136,293

(22) Filed: May 2, 2002

(30) Foreign Application Priority Data

Jan. 19, 2002 (TW) .......................................... 91200734

(51) Int. Cl.[7] .................................................. B62J 1/00
(52) U.S. Cl. .................................... 297/201; 297/256.1
(58) Field of Search .............................. 297/195.1, 201, 297/195.12, 215.13, 215.14, 215.15

(56) References Cited

U.S. PATENT DOCUMENTS

| | | | | |
|---|---|---|---|---|
| 608,682 A | * | 8/1898 | Jamieson | |
| 694,875 A | * | 3/1902 | Meighan | |
| 872,124 A | * | 11/1907 | Hammaren | |
| 4,387,925 A | * | 6/1983 | Barker et al. | |
| 5,911,474 A | * | 6/1999 | Lee | |
| 6,056,356 A | * | 5/2000 | Unger, Jr. | |
| 6,095,600 A | * | 8/2000 | Mattingly | |
| 6,209,954 B1 | * | 4/2001 | Bombardier | |

* cited by examiner

Primary Examiner—Milton Nelson, Jr.
(74) Attorney, Agent, or Firm—Browdy and Neimark, P.L.L.C.

(57) ABSTRACT

A seat assembly for a bicycle having a seat base, two side seat members slidably and respectively mounted at a left and right sides of said seat base such that each of said side seat members can be slid on the seat base towards left or right and positioned at a predetermined position, and a front seat member mounted at a front side of said seat base. Thus, the seat assembly can adjust its width to meet individual body dimension of rider.

15 Claims, 6 Drawing Sheets

SEAT ASSEMBLY OF BICYCLE

FIELD OF THE INVENTION

The present invention relates to a seat assembly, and more particularly to a seat assembly of bicycle, which can adjust the seat width.

BACKGROUND OF THE INVENTION

A conventional seat of bicycle usually provides a rigid base secured on the seat post of the bicycle. The base further provides a foaming material thereon and then covered a cloth piece or a leather piece on the foaming material. The seat has a triangular shape, which is narrow at front end and is wide at back end.

For providing a comfortable sitting status in riding, the seat is made in different sizes for rider to choose a specific seat to meet his/her body dimension. For the point of view, the seat has to be replaced to meet different riders. But this solution is hard to work in practice, because riders have to buy many seats of different sizes.

Furthermore, the conventional seat has a part extended at front side thereof, which will make rider, especial the lady riders, having problem to get on and get off the bicycle.

SUMMARY OF THE INVENTION

The primary objective of the present invention is to provide a seat assembly of bicycle, which can adjust the seat width to meet different riders.

Another objective of the present invention is to provide a seat assembly of bicycle, which can collapse the front side of the seat.

According to the objectives of the present invention, a seat assembly adapted to be mounted on the seat post of a bicycle comprises a seat base, two side seat members slidably and respectively mounted at the left and right sides of said seat base such that each of said side seat members can be slid on the seat base towards left or right and positioned at a predetermined position, and a front seat member pivotally mounted at a front side of said seat base such that the front seat member can be turned between an extending position, in which the front seat member is extending forward from the front side of the seat base, and a collapsing position that the front seat member is collapsed and disposed under the front side of the seat base.

DETAILED DESCRIPTION OF THE INVENTION

Figure 1:
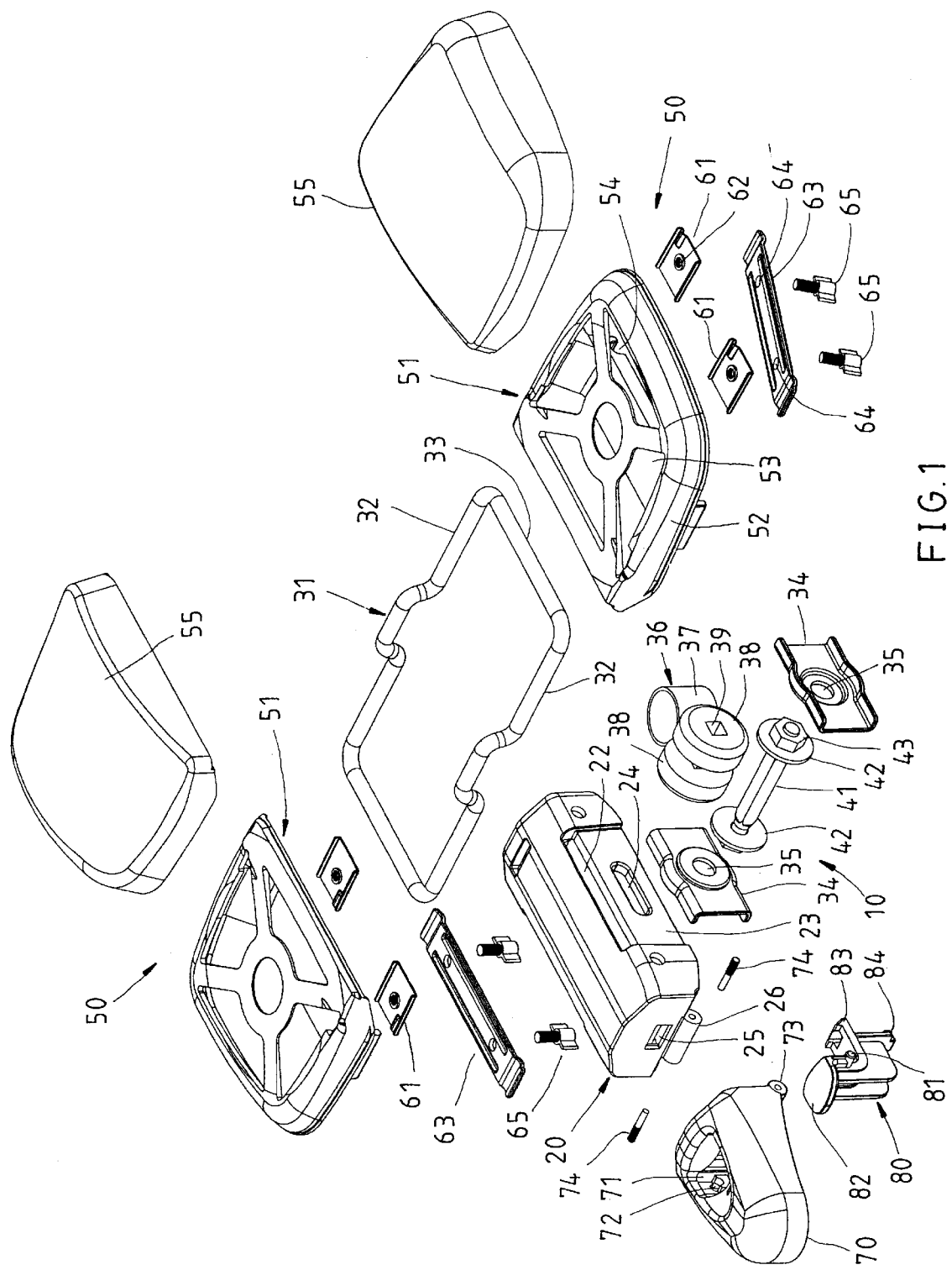
FIG. 1 is an exploded view of a preferred embodiment of the present invention.
Figure 2:
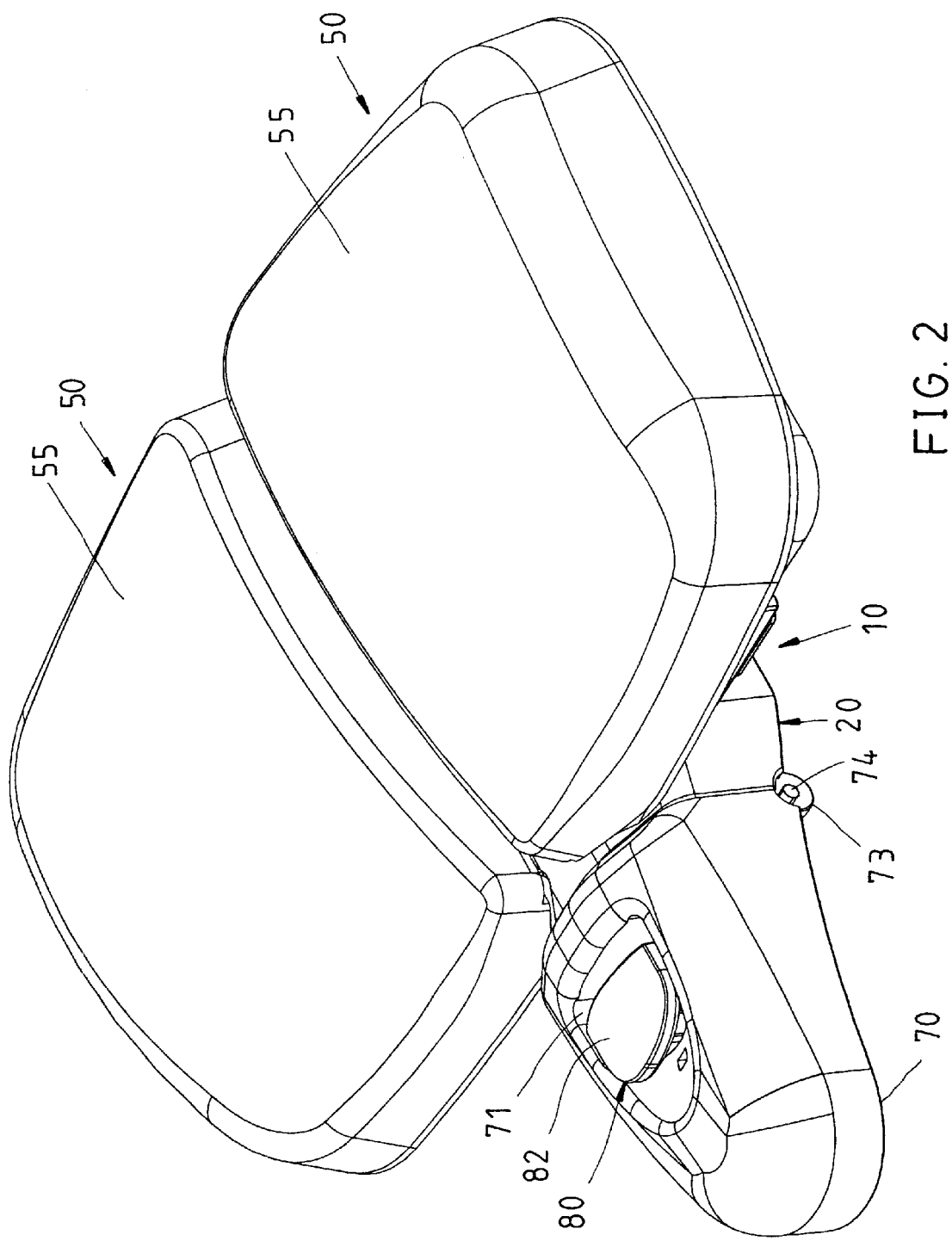
FIG. 2 is a top view of the preferred embodiment of the present invention in combination.
Figure 3:
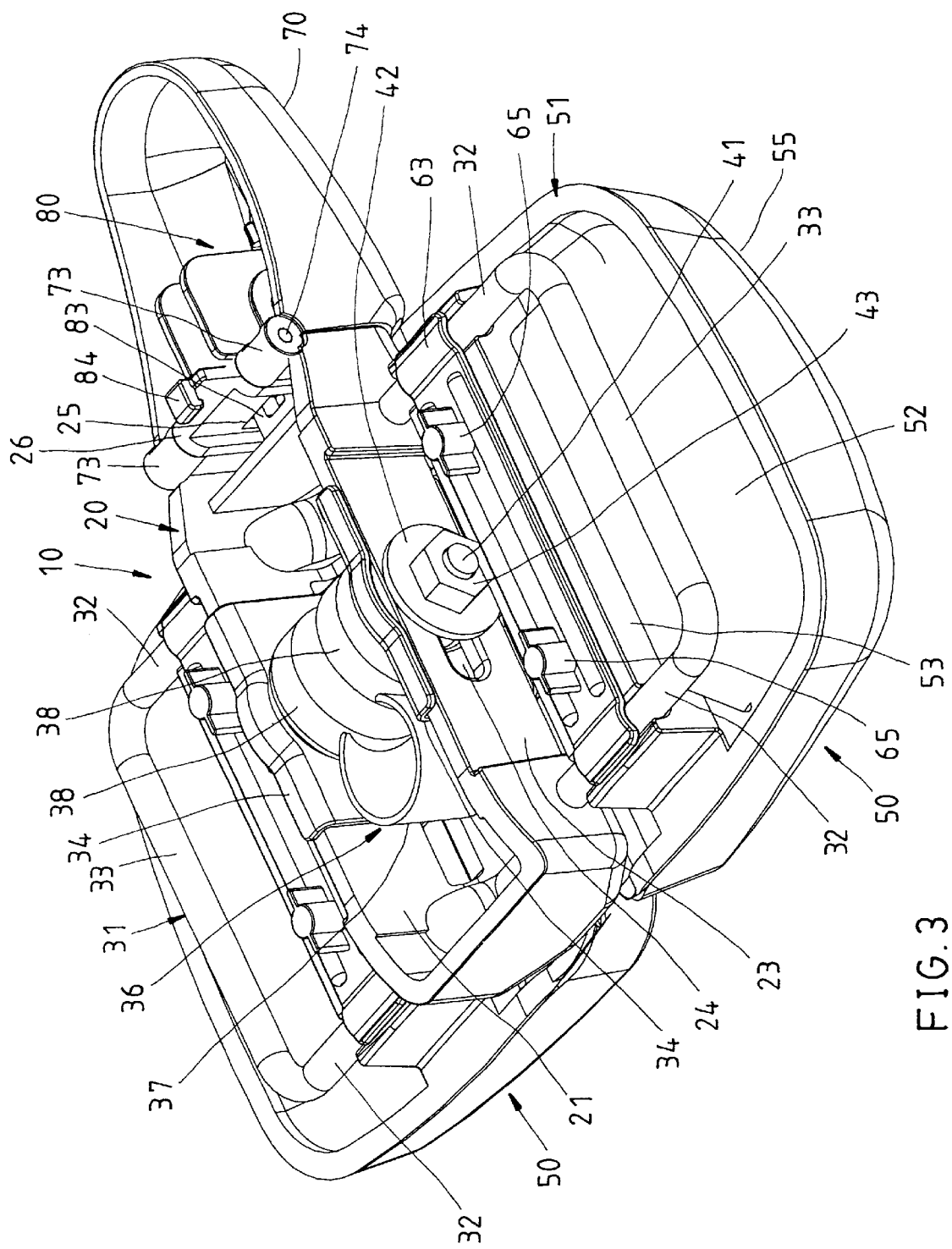
FIG. 3 is a bottom view of the preferred embodiment of the present invention in combination.
Figure 4:
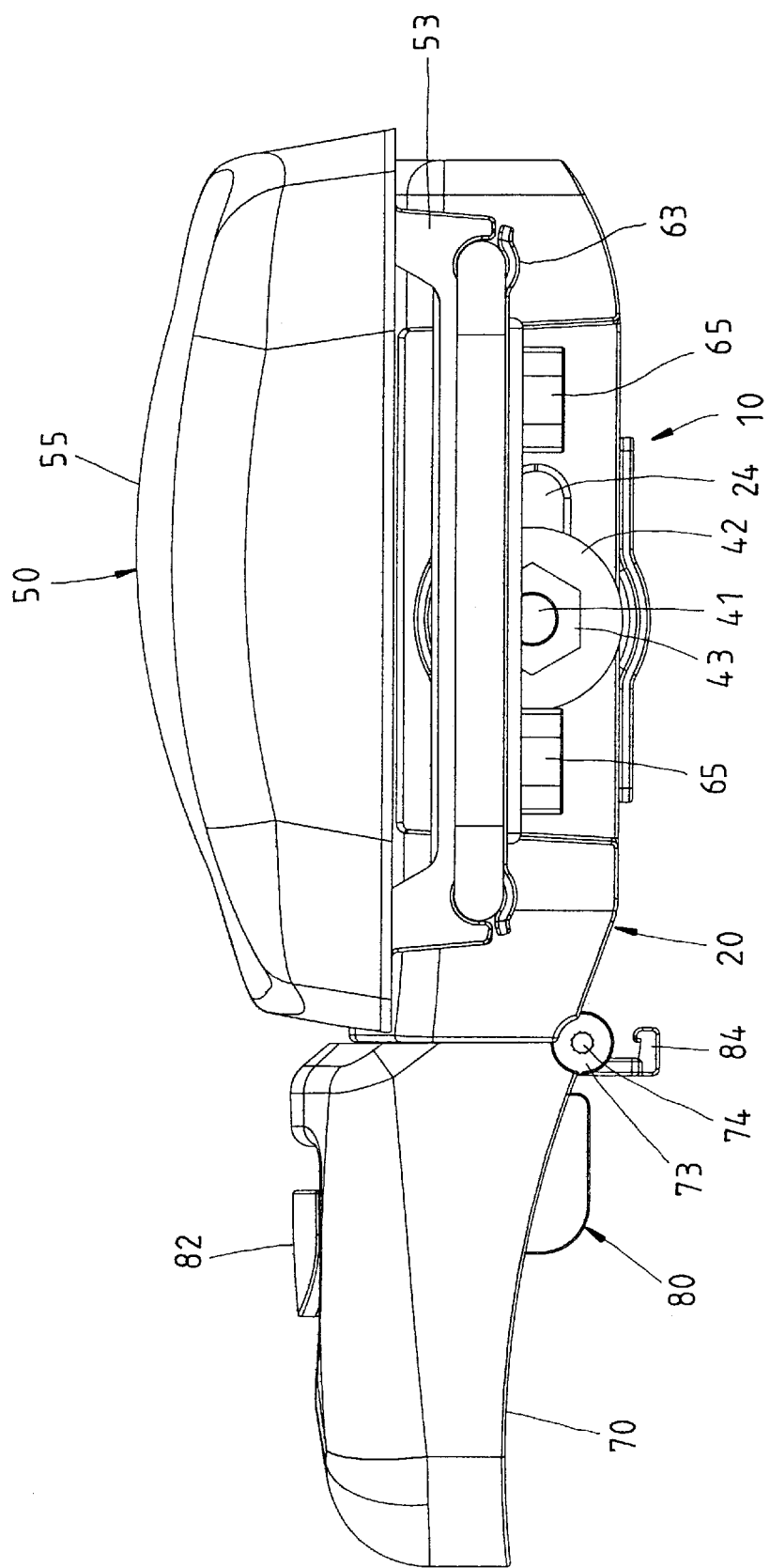
FIG. 4 is a left view of the preferred embodiment of the present invention in combination.

Please refer to FIGS. from FIG. 1 to FIG. 4, a preferred embodiment of the present invention provides a seat assembly, which is mounted on a seat post of a bicycle (not shown), comprising basically a seat base 10, two side seat member 50, a front side seat member 70 and a control member 80.

The seat base 10 has a main seat member 20, which is a rectangular plastic block made from injection molding. The main seat member 20 has a chamber 21 therein, which is opening at bottom side, two elongated slots 22 at lateral sides respectively and two flexible planks 23 respectively below the slots 22, each of which has a guiding slot 24 thereon. The main seat member 20 has a lock opening 25 at front side thereof and a joint tube 26 at bottom end of the front side thereof A metal bar frame 31 has two parallel slide bars 32 and two connect bars 33 connecting the slide bars 32 at ends thereof. Two pad pieces 34, each of which has a round opening 35 thereon, are received in the chamber 21 of the main seat member 20 respectively attaching the flexible planks 23 at interior sides. A mount device 36 has a fasten tube 37, which is C shape in cross-section, two fasten blocks 38 disposed at the exterior sidewall of the fasten tube 37 at opposite sides respectively, each of which has a rectangular opening 39. The mount device 36 is received in the chamber 21 of the main seat member 20 for the rectangular openings 39 on the fasten blocks 38 corresponding to the round openings 35 on the pad pieces 34. A fasten bar 41, which has a rectangular segment at midsection, is inserted into the guiding slots 24 on the flexible planks 23, the round openings 35 on the pad pieces 34 and rectangular openings 39 on the mount device 36. The fasten bar 41 respectively mounts a washer 42 and screws a nut 43 at opposite ends for securing the pad pieces 34 and the mount device 36 in the main seat member 20.

The side seat members 50, each of which has a base member 51 and a soft cushion 55, are disposed at a left and right sides of the seat member 20 respectively. Each base member 51 is made from plastic injection molding, which has a support portion 52 and a bridge portion 53 at the bottom side of the support portion 52. The bridge portion 53 has two parallel grooves 54 and two screw holes (not shown) between the grooves 54. Each soft cushion 55 is made of foaming material attached on the support portion 52 of the base member 51 initially when molding. Finally, a leather piece or a cloth piece is covered on the soft cushion 55.

The grooves 54 of the seat bases 51 respectively receive the slide bars 32 of the bar frame 31 therein for the side seat members 50 can slide along the slide bars 32 toward outside until the side seat members 50 are stopped by the connect bars 33 respectively, or toward inside until the side seat members 50 are contacted with each other, that is, each of said side seat members 50 can be slid on the seat base 20 towards left or right and positioned at a predetermined position. The bridge portion 53 of the side seat member 50 disposes two pads 61 at bottom side thereof, each of which has a screw hole 62 thereon corresponding to the screw holes on the bridge portion 53. Two press pieces 63 respectively covers the pads 61 and the slide bars 32 of the bar frame 31. The press piece 63 has two openings 64 corresponding to the screw holes 62 of the pads 61 for two bolts 65 screwed into the screw holes 62 of the pads 61 and the screw holes of the bridge portion 53 to fix the side seat members 50. In other words, user can turn the bolts 65 loose to drive the side seat members 50 sliding to specific positions and turn the bolts 65 tight to secure the side seat members 50.

Figure 5:
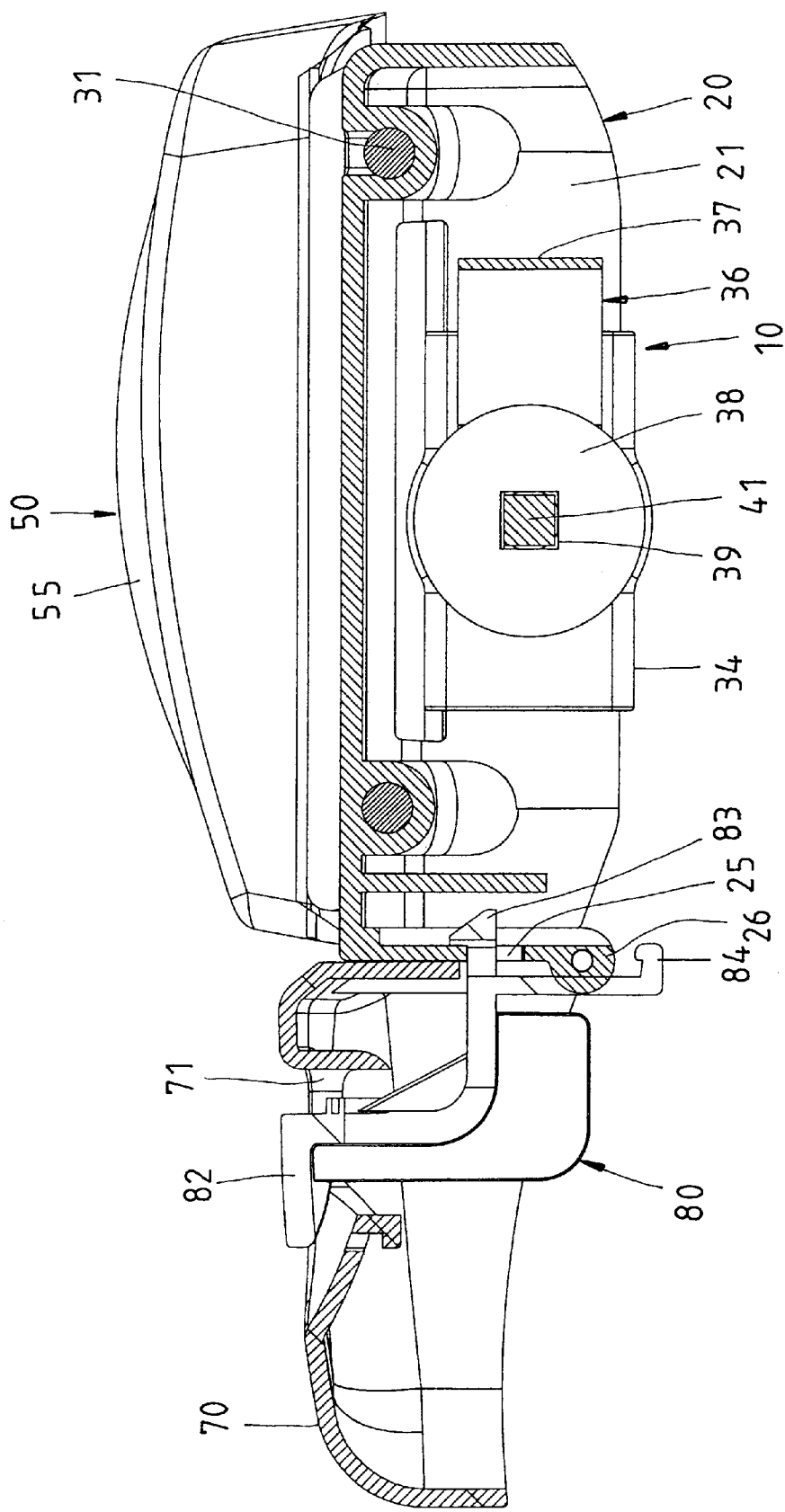
FIG. 5 is a sectional view taken along line 5—5 in FIG. 2, showing the front seat member turned to an extending position.
Figure 6:
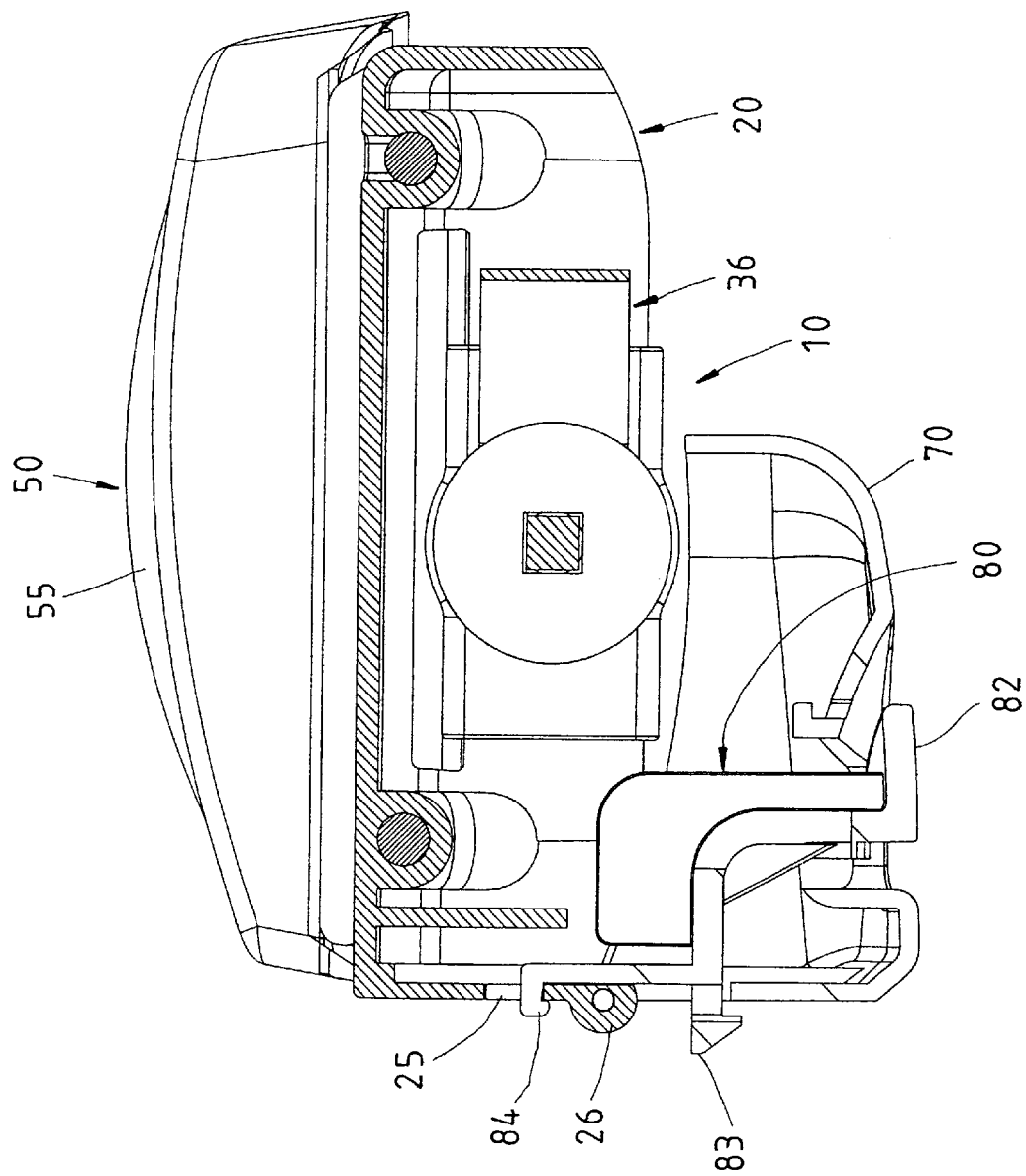
FIG. 6 is a sectional view following FIG. 5, showing the front seat member turned to a collapsing position.

The front seat member 70 is a housing element, which is opening at bottom side thereof and has a through hole 71 at topside thereof. The through hole 71 has two joint holes 72 at the interior wall. The front seat member 70 further has two joint tubes 73 at two sides of the back end thereof. The front seat member 70 is pivoted to the main seat member 20 of the seat base 10 by means of inserting two pins 74 into the joint tubes 73 of the front seat member 70 and the joint tube 26 of the main seat member 20. The front seat member 70 can be turned upwards for the back end thereof attaching the front end of the main seat member 20 and the topside of the front seat member 70 and the topside of the main seat member 20 locate at same level as shown in FIG. 5 (hereinafter referred to as the "extending position" of the front seat member 70). The front seat member 70 also can be turned downwards to the bottom side of the main seat member 20 as shown in FIG. 6 (hereinafter refer to as the "collapsing position" of the front seat member 70).

The control member 80 has two rods 81 at opposite sides thereof and a trigger portion 82 at an end thereof. The control member 80 is received in the front seat member 70 for the trigger portion 82 extending out of the front seat member 70 via the through hole 71 and the rods 81 received in the joint holes 72. The control member 70 further has a first hook 83 at back side thereof and a second hook 84 below the first hook 83.

While the front seat member 70 is turned to the extending position, the first hook 83 of the front seat member 70 will lock with the lock opening 25 of the main seat member 20 to secure the front seat member 70 as shown in FIG. 5. While the front seat member 70 is turned to the collapsing position, the second hook 84 will lock with the lock opening 25 from the opposite side to secure the front seat member 70 as shown in FIG. 6. The trigger portion 25 is to be operated to release the first hook 83 and the second hook 84 locking with the lock opening 25.

The seat assembly of the preferred embodiment of the present invention is mounted on a bicycle (not shown) with the fasten tube 37 of the mount device 36 on the bottom side of the main seat member 20 receiving a seat post (not shown) of the bicycle therein and turning the nuts 43 tight to force the flexible plank 37 pressing the fasten blocks 38 of the mount device 36 to fixed secure the seat assembly of the present invention on the bicycle.

User also can turns the nuts 43 loose a little to make the main seat member 20 can be driven to slide along the guiding slots 24. Thus, the main seat member 20 can be adjusted to an appropriate position and fasten the nuts 43 again to secure the main seat member 20 at the position for rider can adjust the distance between the seat assembly and the handle (not shown) of the bicycle to meet individual body dimension.

The seat width of the seat assembly of the present invention also can be adjusted by means of turning the bolts 65 loose and driving the side seat members to appropriate positions and then turning the bolts 65 tight again.

Furthermore, the front seat member 70 can be turned to the collapsing position to make the rider can get on or get off the bicycle easier. The front seat member 70 can be turned to the extending position after the rider having gotten on the bicycle. The operating mode of turning the front seat member 70 to the extending position and the collapsing position has been described above.

The advantages of the seat assembly of the present invention are:

1. The seat assembly can adjust the seat width thereof to meet individual body dimension of rider.
2. The front seat assembly 70 of the seat assembly can be collapsed to facilitate rider (especial the lady rider) to get on or to get off the bicycle.
3. The distance between the seat assembly and the handle of the bicycle also can be adjusted to meet different riders.

What is claimed is:

1. A seat assembly adapted to be fastened on a seat post of a bicycle, said seat assembly comprising:

a seat base having a left side and a right side;

two side seat members slidably and respectively mounted at the left and right sides of said seat base such that each of said side seat members can be slid on the seat base towards left or right and positioned at a predetermined position;

a front seat member mounted at a front side of said seat base; and wherein said seat base has a main seat member and two substantially parallel slide bars extending outwards from a left side and a right sight of the main seat member; each side seat member has two grooves at a bottom side thereof to respectively receive said slide bars therein and at least one screw hole between said grooves; two press pieces are disposed at a bottom side of said side seat members respectively covering said slide bars with bolts passing through said press pieces and screwing into said screw holes on said side seat members for securing said side seat members on side slide bars respectively.

2. The seat assembly as defined in claim 1, wherein said seat base has a main seat member, which has a chamber therein, two flexible planks at opposite lateral sides thereof respectively and two elongated guiding slots on said flexible planks respectively; a mount device is received in said chamber of said main seat member, which has a fasten tube with a C-shaped cross-section thereof, two fasten blocks on said fasten tube respectively at opposite sides of an opening thereof corresponding to said flexible planks of said main seat member, each of which has an opening thereon, a fasten bar inserted into said guiding slots of said main seat member and said openings of said fasten blocks, and two nuts screwed to the opposite ends of said fasten bar respectively.

3. The seat assembly as defined in claim 1, wherein each of said side seat members has a base member, which has a support portion and a bridge portion at the bottom side of said support portion; said grooves and said screw hole are disposed on the bottom side of said bridge portion; said support portion provides a soft cushion thereon.

4. The seat assembly as defined in claim 1, wherein said front seat member is pivoted at a rear end thereof to the front side of said seat base to be turned between an extending position, in which the topside of said front seat member and the topside of said seat base substantially locate at a same level, and a collapsing position, in which said front seat member is lower than said seat base.

5. The seat assembly as defined in claim 4, wherein said seat base has a lock hole; said front seat member is a housing element, which has a through hole at topside thereof; a control member is disposed at said front seat member, which has a trigger portion at an end thereof extending out of said front seat member via said through hole, a first hook at the other end thereof to lock with said lock hole of said seat base when said front seat member is turned to the extending position and a second hook below said first hook to lock with said lock hole of said seat base when said front seat member is turned to the collapsing position.

6. A seat assembly adapted to be fastened on a seat post of a bicycle, said seat assembly comprising:

a seat base having a left side and a right side;

two side seat members slidably and respectively mounted at the left and right sides of said seat base such that each of said side seat members can be slid on the seat base towards left or right and positioned at a predetermined position;

a front seat member mounted at a front side of said seat base;

wherein said front seat member is pivoted at a rear end thereof to the front side of said seat base to be turned between an extending position, in which the topside of said front seat member and the topside of said seat base substantially locate at a same level, and a collapsing position, in which said front seat member is lower than said seat base.

7. The seat assembly as defined in claim 6, wherein said seat base has a main seat member, which has a chamber therein, two flexible planks at opposite lateral sides thereof respectively and two elongated guiding slots on said flexible planks respectively; a mount device is received in said chamber of said main seat member, which has a fasten tube with a C-shaped cross-section thereof, two fasten blocks on said fasten tube respectively at opposite sides of an opening thereof corresponding to said flexible planks of said main seat member, each of which has an opening thereon, a fasten bar inserted into said guiding slots of said main seat member and said openings of said fasten blocks, and two nuts screwed to the opposite ends of said fasten bar respectively.

8. The seat assembly as defined in claim 6, wherein said seat base has a main seat member and two substantially parallel slide bars extending outwards from a left side and a right sight of the main seat member; each side seat member has two grooves at a bottom side thereof to respectively receive said slide bars therein and at least one screw hole between said grooves; two press pieces are disposed at a bottom side of said side seat members respectively covering said slide bars with bolts passing through said press pieces and screwing into said screw holes on said side seat members for securing said side seat members on side slide bars respectively.

9. The seat assembly as defined in claim 8, wherein each of said side seat members has a base member, which has a support portion and a bridge portion at the bottom side of said support portion; said grooves and said screw hole are disposed on the bottom side of said bridge portion; said support portion provides a soft cushion thereon.

10. The seat assembly as defined in claim 6, wherein said seat base has a lock hole; said front seat member is a housing element, which has a through hole at topside thereof; a control member is disposed at said front seat member, which has a trigger portion at an end thereof extending out of said front seat member via said through hole, a first hook at the other end thereof to lock with said lock hole of said seat base when said front seat member is turned to the extending position and a second hook below said first hook to lock with said lock hole of said seat base when said front seat member is turned to the collapsing position.

11. A seat assembly adapted to be fastened on a seat post of a bicycle, said seat assembly comprising:

a seat base having a left side and a right side;

two side seat members slidably and respectively mounted at the left and right sides of said seat base such that each of said side seat members can be slid on the seat base towards left or right and positioned at a predetermined position;

a front seat member mounted at a front side of said seat base;

wherein said seat base has a main seat member, which has a chamber therein, two flexible planks at opposite lateral sides thereof respectively and two elongated guiding slots on said flexible planks respectively; a mount device is received in said chamber of said main seat member, which has a fasten tube with a C-shaped cross-section thereof, two fasten blocks on said fasten tube respectively at opposite sides of an opening thereof corresponding to said flexible planks of said main seat member, each of which has an opening thereon, a fasten bar inserted into said guiding slots of said main seat member and said openings of said fasten blocks, and two nuts screwed to the opposite ends of said fasten bar respectively.

12. The seat assembly as defined in claim 11, wherein said seat base has a main seat member and two substantially parallel slide bars extending outwards from a left side and a right sight of the main seat member; each side seat member has two grooves at a bottom side thereof to respectively receive said slide bars therein and at least one screw hole between said grooves; two press pieces are disposed at a bottom side of said side seat members respectively covering said slide bars with bolts passing through said press pieces and screwing into said screw holes on said side seat members for securing said side seat members on side slide bars respectively.

13. The seat assembly as defined in claim 12, wherein each of said side seat members has a base member, which has a support portion and a bridge portion at the bottom side of said support portion; said grooves and said screw hole are disposed on the bottom side of said bridge portion; said support portion provides a soft cushion thereon.

14. The seat assembly as defined in claim 11, wherein said front seat member is pivoted at a rear end thereof to the front side of said seat base to be turned between an extending position, in which the topside of said front seat member and the topside of said seat base substantially locate at a same level, and a collapsing position, in which said front seat member is lower than said seat base.

15. The seat assembly as defined in claim 14, wherein said seat base has a lock hole; said front seat member is a housing element, which has a through hole at topside thereof; a control member is disposed at said front seat member, which has a trigger portion at an end thereof extending out of said front seat member via said through hole, a first hook at the other end thereof to lock with said lock hole of said seat base when said front seat member is turned to the extending position and a second hook below said first hook to lock with said lock hole of said seat base when said front seat member is turned to the collapsing position.

\* \* \* \* \*